(12) United States Patent
Manmohan (10) Patent No.: US 9,219,728 B1
(45) Date of Patent: *Dec. 22, 2015

(54) SYSTEMS AND METHODS FOR PROTECTING SERVICES

(71) Applicant: Symantec Corporation, Mountain View, CA (US)

(72) Inventor: Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/510,547

(22) Filed: Oct. 9, 2014

Related U.S. Application Data

(63) Continuation of application No. 13/327,019, filed on Dec. 15, 2011, now Pat. No. 8,898,806.

(51) Int. Cl.
*H04L 29/06* (2006.01)
*G06F 21/62* (2013.01)

(52) U.S. Cl.
CPC ........ *H04L 63/0807* (2013.01); *G06F 21/6209* (2013.01)

(58) Field of Classification Search
CPC . G06F 21/6209; H04L 63/101; H04L 63/126; H04L 63/083; H04L 63/0807
USPC .................. 726/4–9; 713/150, 155, 168, 189
See application file for complete search history.

(56) References Cited

U.S. PATENT DOCUMENTS

| | | |
|---|---|---|
| 8,332,929 B1 | 12/2012 | Bhargava et al. |
| 2002/0095595 A1 | 7/2002 | Christopherson et al. |
| 2004/0010701 A1 | 1/2004 | Umebayashi et al. |
| 2006/0090197 A1 | 4/2006 | Hermann et al. |
| 2007/0156862 A1 | 7/2007 | Yamada et al. |
| 2011/0126281 A1 | 5/2011 | Ben-Zvi et al. |
| 2012/0291103 A1 | 11/2012 | Cohen |

*Primary Examiner* — Izunna Okeke
*Assistant Examiner* — Hee Song
(74) *Attorney, Agent, or Firm* — ALG Intellectual Property, LLC (57) ABSTRACT

A computer-implemented method for protecting services may include (1) identifying a service control manager, the service control manager having access to modify a configuration of at least one service, (2) identifying a request from a process for permission to access the configuration of the service, and, in response to the request, (3) authenticating the process based on at least one attribute of the process, (4) providing an authentication token to the process, (5) intercepting an attempt by the process to access the configuration of the service via the service control manager, the attempt including the authentication token, and, in response to the attempt, (6) validating the authentication token, and, in response to validating the authentication token, (7) allowing the process to access the configuration of the service. Various other methods, systems, and computer-readable media are also disclosed.

20 Claims, 6 Drawing Sheets

SYSTEMS AND METHODS FOR PROTECTING SERVICES

CROSS REFERENCE TO RELATED APPLICATION

This application is a continuation of U.S. application Ser. No. 13/327,019 filed 15 Dec. 2011, the disclosure of which is incorporated, in its entirety, by this reference.

BACKGROUND

Modern operating systems may use services to perform various functions in the background. For example, services may index resources, collect and log information, automatically perform scripted tasks, and/or perform security functions.

In some systems, a system process (such as a service control manager) may manage services and allow processes to interact with services. For example, a service control manager may enable processes to start, stop, and/or configure services. Since some services may protect computing systems against exploits, attacks, and/or intrusions, traditional security systems may protect vital security-related services from being stopped, suspended, and/or deleted. Unfortunately, because attempts by a process to reconfigure a service may be performed through a service control manager by proxy instead of directly by the process, traditional security systems may prove ineffective at distinguishing between legitimate and illegitimate attempts to reconfigure a service, as all attempts may appear to originate from the service control manager. Accordingly, the instant disclosure identifies and addresses a need for additional and improved systems and methods for protecting services.

SUMMARY

As will be described in greater detail below, the instant disclosure generally relates to systems and methods for protecting services by providing legitimate processes with authentication tokens to include in service configuration access attempts and intercepting service configuration access attempts to check for authentication tokens. In one example, a computer-implemented method for protecting services may include (1) identifying a service control manager, the service control manager having access to modify a configuration of at least one service, (2) identifying a request from a process for permission to access the configuration of the service, and, in response to the request, (3) authenticating the process based on at least one attribute of the process, (4) providing an authentication token to the process, (5) intercepting an attempt by the process to access the configuration of the service via the service control manager, the attempt including the authentication token, and, in response to the attempt, (6) validating the authentication token, and, in response to validating the authentication token, (7) allowing the process to access the configuration of the service.

In some examples, the attribute of the process may include (1) a name of the process, (2) a publisher of the process, (3) a fingerprint of the process, and/or (4) an access mode in which the process is allowed to operate. In one example, authenticating the process may include identifying the attribute of the process on a whitelist.

In some embodiments, intercepting the attempt by the process to access the configuration may include determining that the service is a protected service that requires authentication for access. In some examples, the attempt may include the authentication token by using the authentication token instead of an identifier of the service. In these examples, intercepting the attempt by the process to access the configuration of the service may include intercepting an attempt by the process to access a configuration of a false (e.g., non-existent) service identified by the authentication token. Additionally, in these examples, allowing the process to access the configuration of the service may include modifying the attempt to include the identifier of the service instead of the authentication token.

In some embodiments, allowing the process to access the configuration of the service may include performing an operation on the configuration of the service that was specified in the attempt. In at least one example, the computer-implemented method may also include, in response to allowing the attempt by the process to access the configuration of the service, invalidating the authentication token for future use.

In one embodiment, a system for implementing the above-described method may include an identification module programmed to (1) identify a service control manager, the service control manager having access to modify a configuration of at least one service and (2) identify a request from a process for permission to access the configuration of the service. The system may also include an authentication module programmed to, in response to the request, (1) authenticate the process based on at least one attribute of the process and (2) provide an authentication token to the process. The system may additionally include an interception module programmed to intercept an attempt by the process to access the configuration of the service via the service control manager, the attempt comprising the authentication token. The system may also include a validation module programmed to, in response to the attempt, (1) validate the authentication token, and, in response to validating the authentication token, (2) allow the process to access the configuration of the service. The system may additionally include at least one processor configured to execute the identification module, the authentication module, the interception module, and the validation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a service control manager, the service control manager having access to modify a configuration of at least one service, (2) identify a request from a process for permission to access the configuration of the service, and, in response to the request, (3) authenticate the process based on at least one attribute of the process, (4) provide an authentication token to the process, (5) intercept an attempt by the process to access the configuration of the service via the service control manager, the attempt including the authentication token, and, in response to the attempt, (6) validate the authentication token, and, in response to validating the authentication token, (7) allow the process to access the configuration of the service.

As will be explained in greater detail below, by providing legitimate processes with authentication tokens to include in service configuration access attempts and intercepting service configuration access attempts to check for authentication tokens, the systems and methods described herein may effectively protect services from illegitimate processes, thereby potentially preventing malicious processes from circumventing protections provided by services through illegitimate configuration changes to the services.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
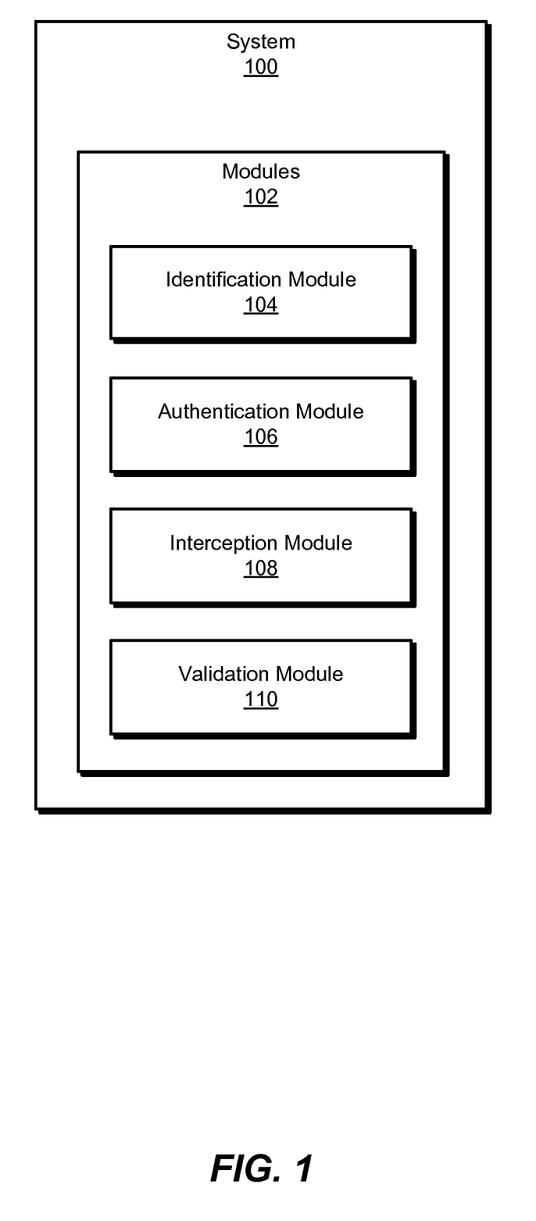
FIG. 1 is a block diagram of an exemplary system for protecting services.
Figure 2:
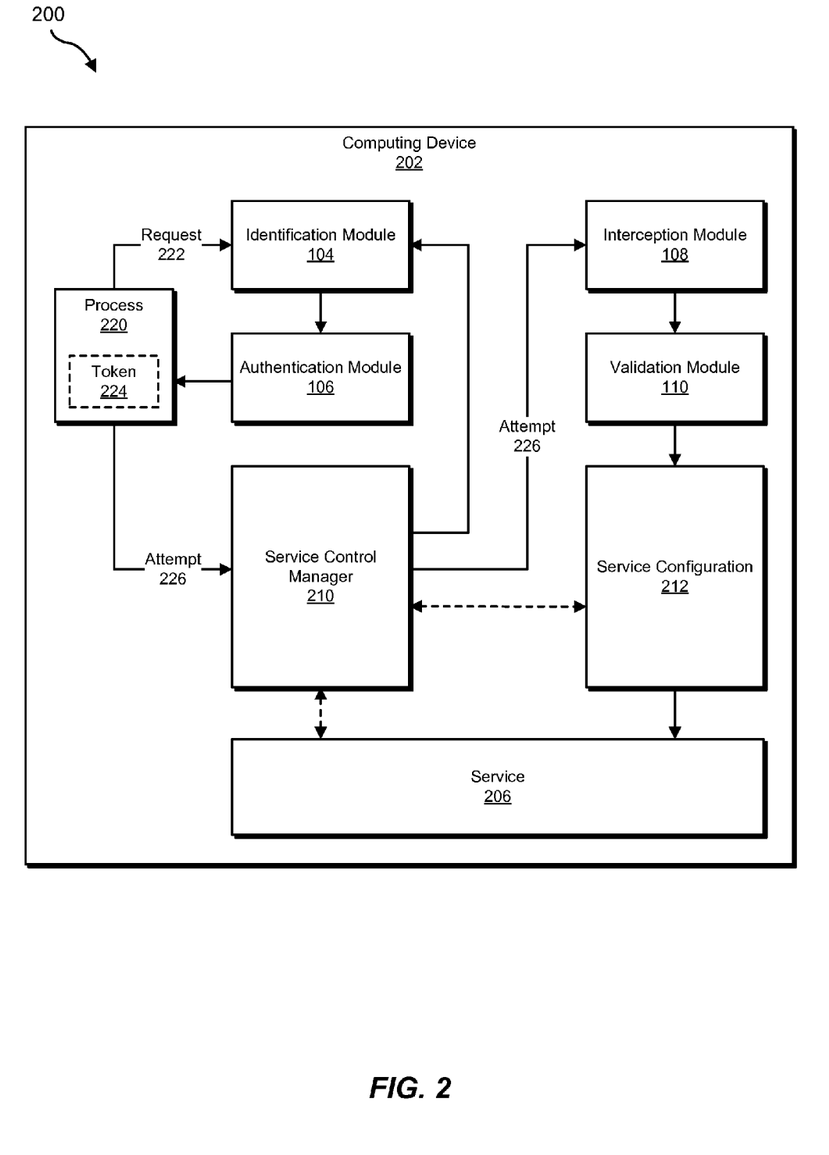
FIG. 2 is a block diagram of an exemplary system for protecting services.
Figure 3:
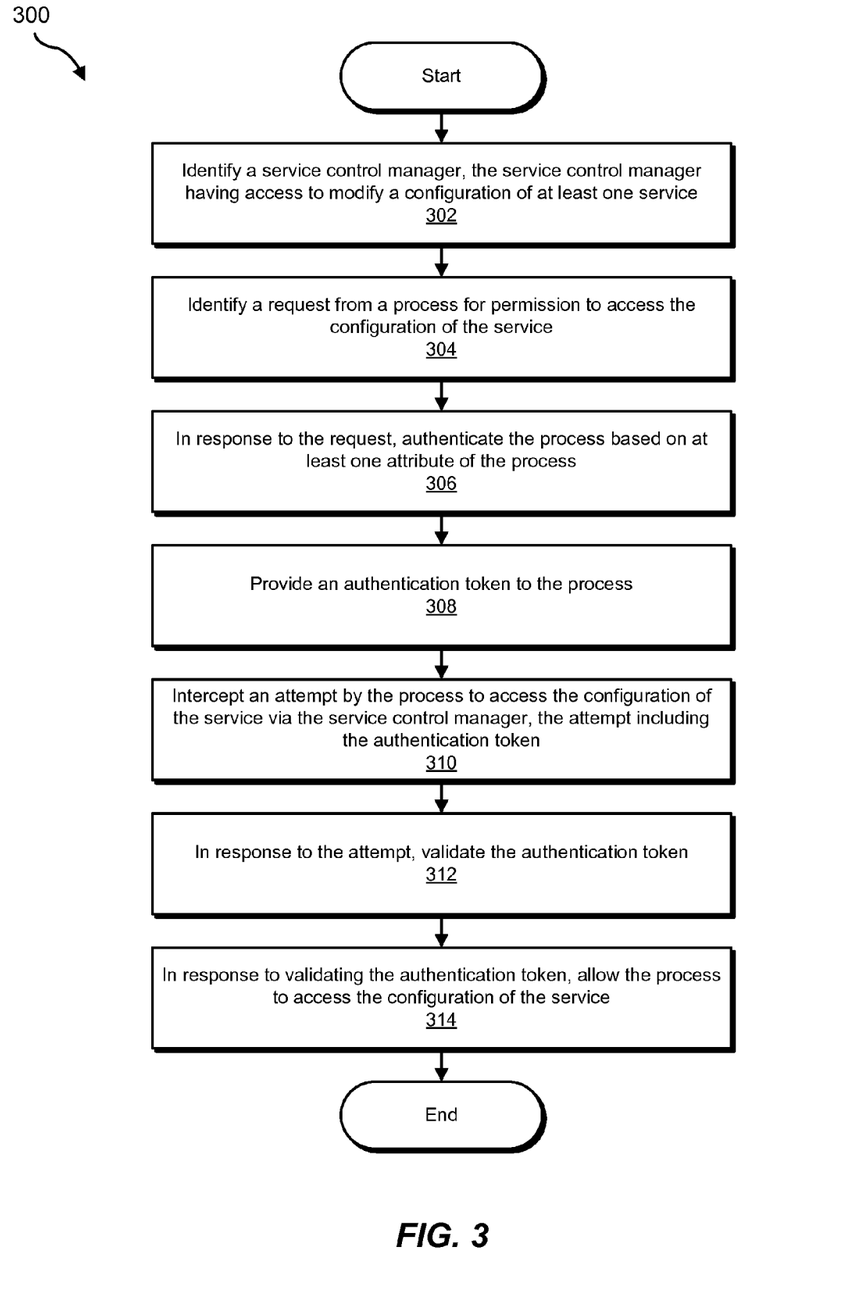
FIG. 3 is a flow diagram of an exemplary method for protecting services.
Figure 4:
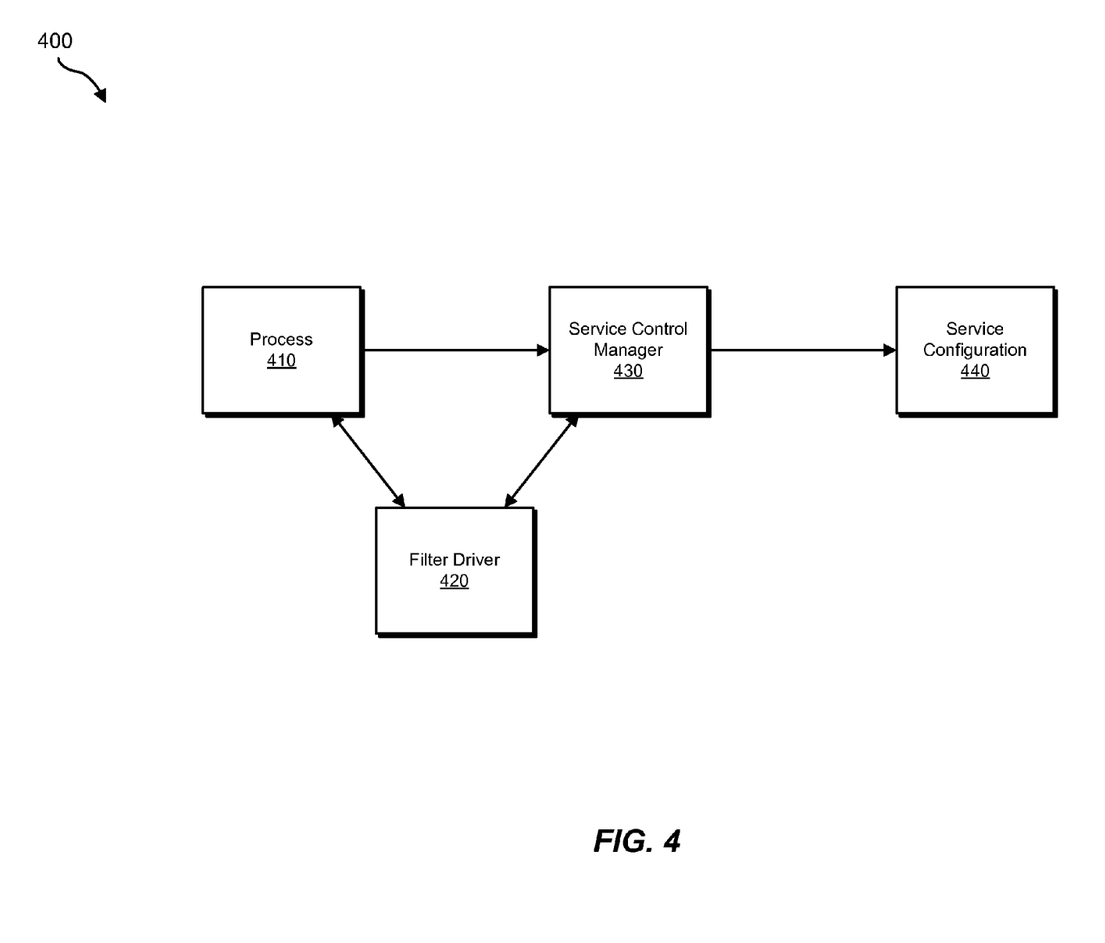
FIG. 4 is a block diagram of an exemplary system for protecting services.

The following will provide, with reference to FIGS. 1, 2, and 4, detailed descriptions of exemplary systems for protecting services. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for protecting services. As illustrated in this figure, exemplary system 100 may include one or more modules 102 for performing one or more tasks. For example, and as will be explained in greater detail below, exemplary system 100 may include an identification module 104 programmed to (1) identify a service control manager, the service control manager having access to modify a configuration of at least one service and (2) identify a request from a process for permission to access the configuration of the service. Exemplary system 100 may also include an authentication module 106 programmed to (1) authenticate the process based on at least one attribute of the process and (2) provide an authentication token to the process. Exemplary system 100 may additionally include an interception module 108 programmed to intercept an attempt by the process to access the configuration of the service via the service control manager, the attempt comprising the authentication token.

In addition, and as will be described in greater detail below, exemplary system 100 may include a validation module 110 programmed to (1) validate the authentication token, and, in response to validating the authentication token, (2) allow the process to access the configuration of the service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 running a service 206.

In one embodiment, identification module 104, authentication module 106, interception module 108, and/or validation module 110 from FIG. 1 may, when executed by at least one processor of computing device 202, facilitate computing device 202 in protecting services. For example, and as will be described in greater detail below, one or more of modules 102 may cause computing device 202 to (1) identify a service control manager (e.g., service control manager 210), the service control manager having access to modify a configuration (e.g., service configuration 212) of at least one service (e.g., service 206), (2) identify a request (e.g., request 222) from a process (e.g., process 220) for permission to access the configuration of the service, and, in response to the request, (3) authenticate the process based on at least one attribute of the process (e.g., authenticate process 220 in response to request 222), (4) provide an authentication token (e.g., token 224) to the process, (5) intercept an attempt (e.g., attempt 226) by the process to access the configuration of the service via the service control manager, the attempt including the authentication token, and, in response to the attempt, (6) validate the authentication token (e.g., validate token 224 within attempt 226), and, in response to validating the authentication token, (7) allow the process to access the configuration of the service (e.g., allowing process 220 to access service configuration 212).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

FIG. 3 is a flow diagram of an exemplary computer-implemented method 300 for protecting services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a service control manager, the service control manager having access to modify a configuration of at least one service. For example, at step 302 identification module 104 may, as part of computing device 202 in FIG. 2, identify service control manager 210 that has access to modify service configuration 212 of service 206.

As used herein, the phrase "service control manager" may refer to any process, proxy, and/or interface for managing and/or configuring one or more services. For example, the service control manager may serve as a gateway through which services are started, stopped, suspended, and/or interacted with. An example of the service control manager includes the Service Control Manager process of MICROSOFT WINDOWS (e.g., "services.exe"). As used herein, the term "service" may refer to any process suitable for protection by the systems and methods described herein. In some examples, the term "service" may refer to a process with one or more system-level privileges. Additionally or alternatively, the term "service" may refer to a process configured to run in the background with minimal or no user interaction. In some examples, the term "service" may refer to a process that performs and/or facilitates the performance of one or more security tasks (e.g., monitoring data traffic, scanning files, etc.). In some examples, the term "service" may refer to a daemon process.

As used herein, the term "configuration" as it relates to a service may refer to any parameter, option, and/or other configuration data affecting the operation of the service. In some examples, the configuration of a service may determine whether the service properly performs one or more security tasks. In some examples, the service control manager may host the configuration of the service (e.g., in memory allocated to the service control manager). Additionally or alternatively, the configuration of the service may be stored and/or persisted (e.g., by the service control manager) in a system registry and/or other configuration store. For example, the service control manager may persist any changes to the configuration in a MICROSOFT WINDOWS registry hive (e.g., "HKLM\System\CurrentControlSet\services\"). In some examples, access to modifying the configuration may be normally restricted (e.g., to the service control manager).

Identification module 104 may identify the service control manager in any suitable manner. For example, identification module 104 may identify the service control manager by identifying a process identifier of the service control manager.

FIG. 4 is an illustration of an exemplary system 400 for protecting services. As shown in FIG. 4, exemplary system 400 may include a process 410, a filter driver 420, a service control manager 430, and a service configuration 440. Using FIG. 4 as an example, at step 302 identification module 104 may identify service control manager 430.

Returning to FIG. 3, at step 304 one or more of the systems described herein may identify a request from a process for permission to access the configuration of the service. For example, at step 304 identification module 104 may, as part of computing device 202 in FIG. 2, identify request 222 from process 220 for permission to access the configuration of service 206. Using FIG. 4 as an example, at step 304 identification module 104 may (e.g., as a part of filter driver 420) identify a request from process 410 to access service configuration 440.

As used herein, the term "process" may refer to any program in execution (e.g., an instantiation and/or running copy of a program expressed by an executable file). In some examples, the process may include multiple processes, threads, and/or subprocesses.

Identification module 104 may identify the request in any suitable form. For example, identification module 104 may operate as a part of a system driver (e.g., a filter driver). In this example, the process may issue the request by performing a system call directed to the driver. For example, the process may issue a private ioctl (e.g., via the DeviceIoControl function in MICROSOFT WINDOWS). Accordingly, identification module 104 may identify the request by receiving and/or executing the system call. In at least one example, the request (e.g., the system call) may identify the service.

The request may constitute a request for permission to access the configuration of the service in any of a variety of ways. For example, the request may include a request for an authentication token to grant one or more privileges that include access to the configuration of the service (e.g., access to modify the configuration of the service).

Returning to FIG. 3, at step 306 one or more of the systems described herein may, in response to the request, authenticate the process based on at least one attribute of the process. For example, at step 306 authentication module 106 may, as part of computing device 202 in FIG. 2, authenticate process 220 in response to request 222 based on at least one attribute of process 220. Using FIG. 4 as an example, at step 306 authentication module 106 may (e.g., as a part of filter driver 420) authenticate process 220 based on at least one attribute of process 220.

Authentication module 106 may authenticate the process based on any of a variety of attributes of the process. For example, the attribute of the process may include a name of the process. Additionally or alternatively, the attribute of the process may include a publisher of the process (e.g., of a program and/or executable underlying the process). In some examples, the attribute of the process may include a fingerprint of the process. For example, authentication module 106 may scan one or more portions of the process in memory (e.g., sampling and/or taking a hash of one or more of the portions). Additionally or alternatively, authentication module 106 may identify a digital signature associated with the process by an operating system hosting the process. In some examples, the attribute of the process may include an access mode in which the process is allowed to operate. For example, the attribute of the process may include a protection ring in which the process operates (e.g., enforced by an operating system and/or within a processor architecture).

Authentication module 106 may authenticate the process using the attribute of the process in any of a variety of ways. For example, authentication module 106 may identify the attribute of the process on a whitelist. For example, authentication module 106 may identify a name of the process on a whitelist of trusted processes, a publisher of the process on a whitelist of trusted publishers, a digital signature of the process on a whitelist of trusted digital signatures, etc. Additionally or alternatively, authentication module 106 may use any other formula and/or heuristic for determining whether to authenticate the process based on one or more attributes of the process and any other available data regarding the process.

In some examples, authentication module 106 may, prior to authenticating the process, determine whether the service and/or the configuration of the service requires protection. For example, authentication module 106 may consult a list of services that require protection to determine that the service requires protection. In some examples, authentication module 106 may receive an additional request for authentication for an additional service that does not require protection. In this example, authentication module 106 may return an error. Additionally or alternatively, in this example authentication module 106 may return the name of the process in place of an authentication token. As will be explained in greater detail below, in some examples this may ensure that the process correctly accesses the configuration of the additional, unprotected service. In some examples, authentication module 106 may determine that a process is illegitimate and/or unauthorized. In this example, authentication module 106 may return an error and/or block the illegitimate process rather than authenticating the illegitimate process.

Returning to FIG. 3, at step 308 one or more of the systems described herein may provide an authentication token to the process. For example, at step 308 authentication module 106 may, as part of computing device 202 in FIG. 2, provide token 224 to process 220 in response to request 222. Using FIG. 4 as an example, at step 308 authentication module 106 may (e.g., as a part of filter driver 420) provide an authentication token to process 220.

Authentication module 106 may provide any form of authentication token to the process. As used herein, the phrase "authentication token" may refer to any data used for demonstrating the authentication of the process and/or for enabling the process and/or the service control manager to access the configuration of the service.

In some examples, authentication module 106 may update an authentication list with the authentication token. For example, authentication module 106 may maintain an internal cache of authentication tokens. In this example, authentication module 106 may also associate an identifier of the service included in the request (e.g., a name of the service) with the cached authentication token. Additionally or alternatively, authentication module 106 may associate one or more attributes of the process with the cached authentication token in the internal cache. For example, authentication module 106 may associate an access mode of the process with the cached authentication token in the internal cache.

Returning to FIG. 3, at step 310 one or more of the systems described herein may intercept an attempt by the process to access the configuration of the service via the service control manager, the attempt including the authentication token. For example, at step 310 interception module 108 may, as part of computing device 202 in FIG. 2, intercept attempt 226 by process 220 to access service configuration 212 via service control manager 210, attempt 226 including token 224. Using FIG. 4 as an example, at step 310 interception module 108 may (e.g., as a part of filter driver 420) intercept authentication token of process 220.

Interception module 108 may intercept the attempt in any suitable manner. For example, interception module 108 may intercept an input/output operation directed to the configuration (e.g., a registry where the configuration is stored) from the service control manager. In this example, interception module 108 may operate as a part of a filter driver.

The attempt may include any of a variety of forms and occur in any of a number of stages. For example, the process may initiate the attempt via an application programming interface of the service control manager (e.g., by issuing a remote procedure call to the service control manager). The service control manager may then continue the attempt by performing an input/output operation on the configuration (e.g., in a registry). In this example, interception module 108 may intercept the attempt by intercepting the input/output operation.

The attempt may include the authentication token in any of a variety of ways. For example, the attempt may include the authentication token by using the authentication token instead of an identifier of the service. For example, the process may, when attempting to access the configuration of the service via the service control manager, use the authentication token in place of the name of the service in a request to the service control manager. In this example, the service control manager may then issue an input/output operation to a registry that identifies a false (e.g., non-existent) service. Accordingly, interception module 108 may intercept the attempt by the process to access the configuration of the service by intercepting an attempt by the process to access the configuration of a false service identified by the authentication token (e.g., by intercepting an attempt that uses the authentication token as the name of a non-existent service).

Returning to FIG. 3, at step 312 one or more of the systems described herein may, in response to the attempt, validate the authentication token. For example, at step 312 validation module 110 may, as part of computing device 202 in FIG. 2, validate token 224 intercepted in attempt 226.

Validation module 110 may validate the authentication token in any suitable manner. For example, as mentioned earlier, one or more of the systems described herein may have stored a copy of the authentication token in an internal cache (e.g., along with the name of the service). In this example, validation module 110 may compare the authentication token found in the intercepted attempt with the internal cache to determine that the authentication token represents a valid authentication of the attempt by the process to access the configuration of the service.

Returning to FIG. 3, at step 314 one or more of the systems described herein may, in response to validating the authentication token, allow the process to access the configuration of the service. For example, at step 314 validation module 110 may, as part of computing device 202 in FIG. 2, allow process 220 to access service configuration 212.

Validation module 110 may allow the process to access the configuration of the service in any of a variety of ways. For example, validation module 110 may allow the process to access the configuration of the service by performing an operation on the configuration of the service that was specified in the attempt by the process. For example, validation module 110 may modify the configuration of the service as attempted by the process. Additionally or alternatively, validation module 110 may allow the process to access the configuration of the service by allowing the intercepted attempt to proceed (e.g., by allowing the service control manager to write to a registry entry of the configuration).

As mentioned earlier, in some examples the process may have used the authentication token in place of an identifier of the service (e.g., the service name) in the attempt. In this example, validation module 110 may allow the process to access the configuration of the service by modifying the attempt to include the identifier of the service instead of the authentication token. In this manner, the attempt to access the configuration of the service may be correctly directed to the service instead of a false target specified by the authentication token when interpreted as an identifier of a service.

In some examples, validation module 110 may also, in response to allowing the attempt by the process to access the configuration of the service, invalidate the authentication token for future use. For example, as mentioned earlier, in some examples one or more of the systems described herein may have stored the authentication token in an internal cache in order to later identify the authentication token as such. Accordingly, validation module 110 may, in response to allowing the attempt by the process to access the configuration of the service, remove the authentication token from the internal cache.

As explained above, by providing legitimate processes with authentication tokens to include in service configuration access attempts and intercepting service configuration access attempts to check for authentication tokens, the systems and methods described herein may effectively protect services from illegitimate processes, thereby potentially preventing malicious processes from circumventing protections provided by services through illegitimate configuration changes to the services.

Figure 5:
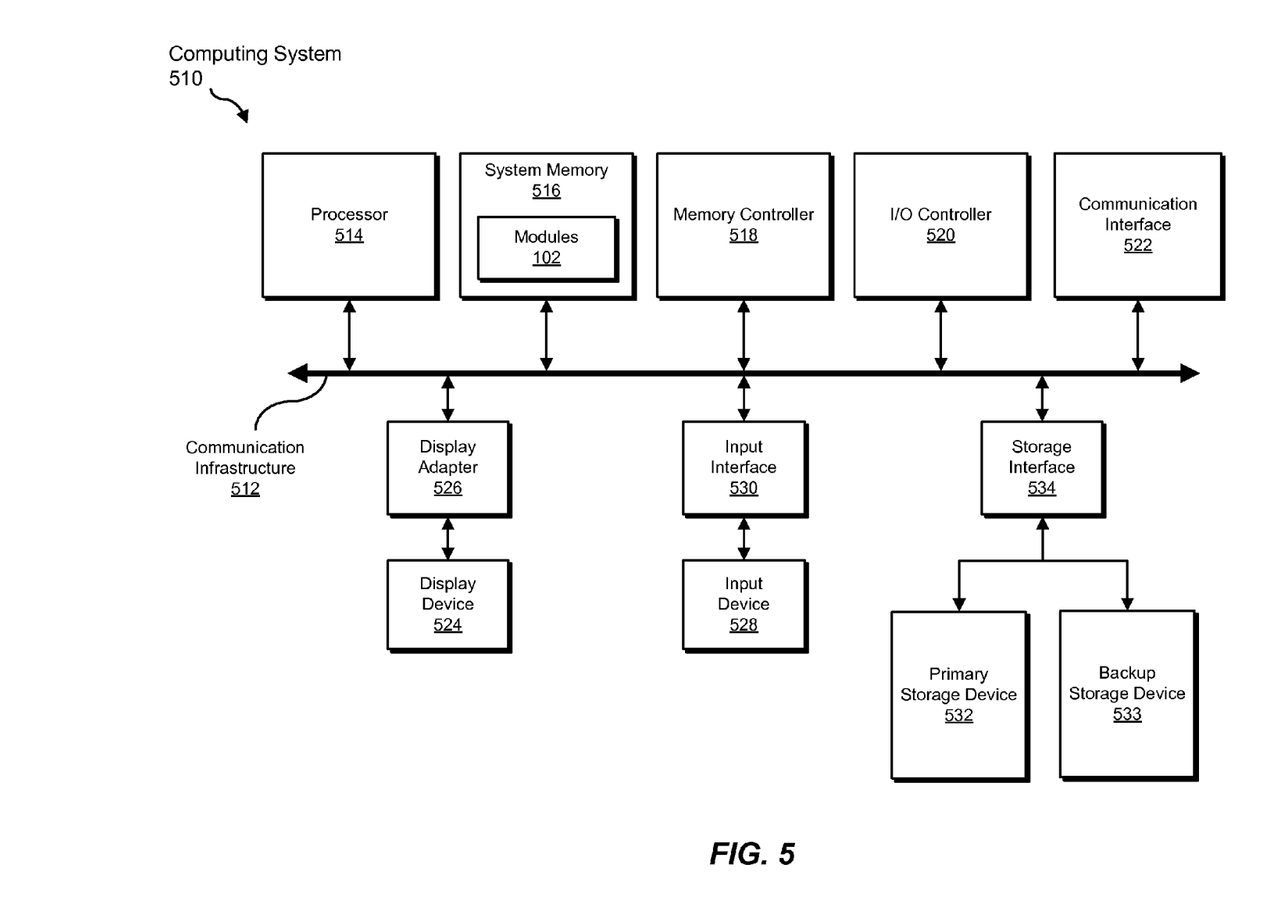
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, authenticating, providing, intercepting, determining, using, validating, allowing, performing, and/or invalidating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
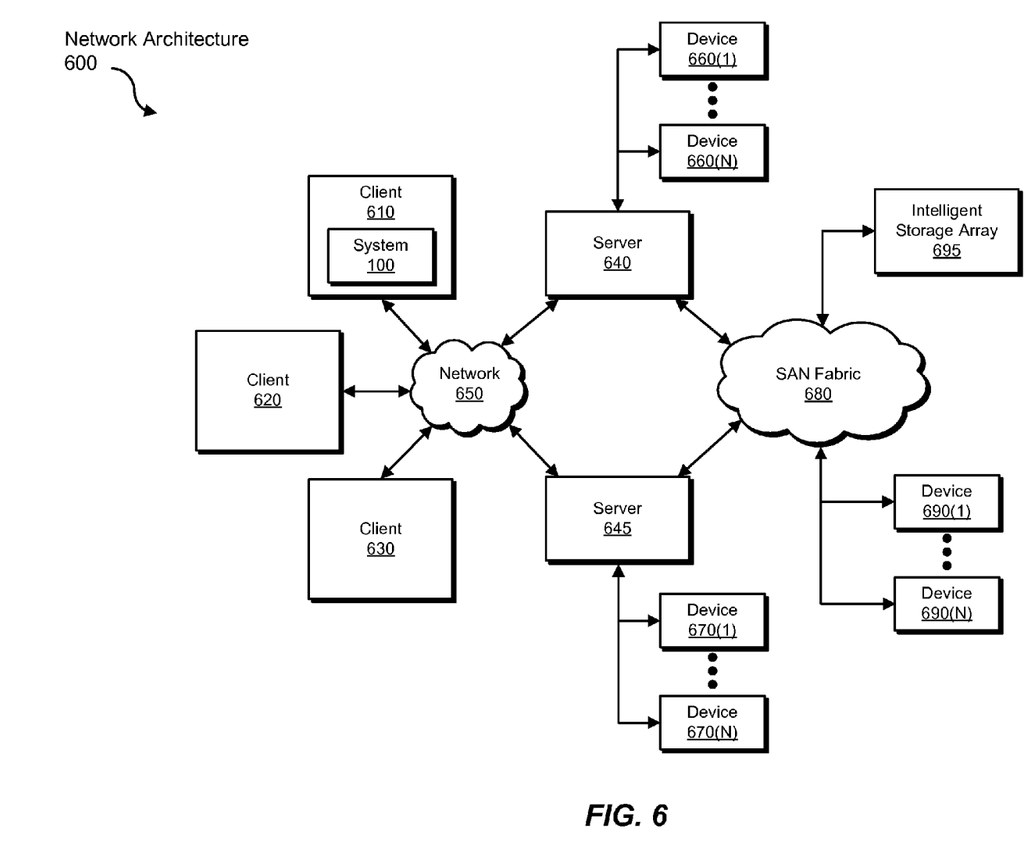
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, authenticating, providing, intercepting, determining, using, validating, allowing, performing, and/or invalidating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for protecting services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for protecting services.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting services, at least a portion of the method being performed by a computing device comprising at least one processor, the method comprising:
    identifying a service control manager, the service control manager having access to modify a configuration of at least one service;
    identifying a request from a process for permission to access the configuration of the service;
    in response to the request:
    authenticating the process based on at least one attribute of the process;
    providing an authentication token to the process;
    intercepting an attempt by the process to access the configuration of the service via the service control manager, the attempt comprising the authentication token;
    in response to the attempt, validating the authentication token;
    in response to validating the authentication token, allowing the process to access the configuration of the service.

2. The computer-implemented method of claim 1, wherein intercepting the attempt by the process to access the configuration of the service comprises determining that the service is a protected service that requires authentication for access.

3. The computer-implemented method of claim 1, wherein:
    the attempt comprises the authentication token by using the authentication token instead of an identifier of the service;
    intercepting the attempt by the process to access the configuration of the service comprises intercepting an attempt by the process to access a configuration of a false service identified by the authentication token.

4. The computer-implemented method of claim 3, wherein allowing the attempt by the process to access the configuration of the service comprises modifying the attempt to comprise the identifier of the service instead of the authentication token.

5. The computer-implemented method of claim 1, wherein the attribute of the process comprises at least one of:
    a name of the process;
    a publisher of the process;
    a fingerprint of the process;
    an access mode in which the process is allowed to operate.

6. The computer-implemented method of claim 1, wherein authenticating the process comprises identifying the attribute of the process on a whitelist.

7. The computer-implemented method of claim 1, wherein allowing the attempt by the process to access the configuration of the service comprises performing an operation on the configuration of the service that was specified in the attempt.

8. The computer-implemented method of claim 1, further comprising, in response to allowing the attempt by the process to access the configuration of the service, invalidating the authentication token for future use.

9. A system for protecting services, the system comprising:
  memory;
  an identification module, stored in the memory, programmed to:
    identify a service control manager, the service control manager having access to modify a configuration of at least one service;
    identify a request from a process for permission to access the configuration of the service;
  an authentication module, stored in the memory, programmed to, in response to the request:
    authenticate the process based on at least one attribute of the process;
    provide an authentication token to the process;
  an interception module, stored in the memory, programmed to intercept an attempt by the process to access the configuration of the service via the service control manager, the attempt comprising the authentication token;
  a validation module, stored in the memory, programmed to:
    in response to the attempt, validate the authentication token;
    in response to validating the authentication token, allow the process to access the configuration of the service;
  at least one physical processor configured to execute the identification module, the authentication module, the interception module, and the validation module.

10. The system of claim 9, wherein the interception module is programmed to intercept the attempt by the process to access the configuration of the service by determining that the service is a protected service that requires authentication for access.

11. The system of claim 9, wherein:
  the attempt comprises the authentication token by using the authentication token instead of an identifier of the service;
  the interception module is programmed to intercept the attempt by the process to access the configuration of the service by intercepting an attempt by the process to access a configuration of a false service identified by the authentication token.

12. The system of claim 11, wherein the validation module is programmed to allow the attempt by the process to access the configuration of the service by modifying the attempt to comprise the identifier of the service instead of the authentication token.

13. The system of claim 9, wherein the attribute of the process comprises at least one of:
  a name of the process;
  a publisher of the process;
  a fingerprint of the process;
  an access mode in which the process is allowed to operate.

14. The system of claim 9, wherein the authentication module is programmed to authenticate the process by identifying the attribute of the process on a whitelist.

15. The system of claim 9, wherein the validation module is programmed to allow the attempt by the process to access the configuration of the service by performing an operation on the configuration of the service that was specified in the attempt.

16. The system of claim 9, wherein the validation module is further programmed to, in response to allowing the attempt by the process to access the configuration of the service, invalidate the authentication token for future use.

17. A non-transitory computer-readable-storage medium comprising one or more computer-executable instructions that, when executed by at least one processor of a computing device, cause the computing device to:
  identify a service control manager, the service control manager having access to modify a configuration of at least one service;
  identify a request from a process for permission to access the configuration of the service;
  in response to the request:
  authenticate the process based on at least one attribute of the process;
  provide an authentication token to the process;
  intercept an attempt by the process to access the configuration of the service via the service control manager, the attempt comprising the authentication token;
  in response to the attempt, validate the authentication token;
  in response to validating the authentication token, allow the process to access the configuration of the service.

18. The non-transitory computer-readable-storage medium of claim 17, wherein the one or more computer-executable instructions cause the computing device to intercept the attempt by the process to access the configuration of the service by causing the computing device to determine that the service is a protected service that requires authentication for access.

19. The non-transitory computer-readable-storage medium of claim 17, wherein:
  the attempt comprises the authentication token by using the authentication token instead of an identifier of the service;
  the one or more computer-executable instructions cause the computing device to intercept the attempt by the process to access the configuration of the service by causing the computing device to intercept an attempt by the process to access a configuration of a false service identified by the authentication token.

20. The non-transitory computer-readable-storage medium of claim 19, wherein the one or more computer-executable instructions cause the computing device to allow the attempt by the process to access the configuration of the service by causing the computing device to modify the attempt to comprise the identifier of the service instead of the authentication token.

* * * * *